(12) United States Patent
Budiardjo et al.

(10) Patent No.: US 12,519,860 B2
(45) Date of Patent: Jan. 6, 2026

(54) METHODS OF CONNECTING CLIENT/SERVER APPLICATION INSTANCES IN DISTRIBUTED NETWORKS USING CONNECTION PROFILES, RELATED SYSTEMS AND ARTICLES OF MANUFACTURE

(71) Applicant: Padi, Inc., Raleigh, NC (US)

(72) Inventors: Anto Budiardjo, Asheville, NC (US); Ian Wade, Isleworth (GB)

(73) Assignee: Padi, Inc., Raleigh, NC (US)

( * ) Notice: Subject to any disclaimer, the term of this patent is extended or adjusted under 35 U.S.C. 154(b) by 0 days.

(21) Appl. No.: 17/660,397

(22) Filed: Apr. 22, 2022

(65) Prior Publication Data

US 2022/0279047 A1    Sep. 1, 2022

Related U.S. Application Data

(63) Continuation-in-part of application No. 17/152,301, filed on Jan. 19, 2021.

(60) Provisional application No. 63/284,939, filed on Dec. 1, 2021, provisional application No. 62/961,890, filed on Jan. 16, 2020.

(51) Int. Cl.
*H04L 67/303* (2022.01)
*H04L 67/06* (2022.01)
*H04L 67/1001* (2022.01)

(52) U.S. Cl.
CPC ............ *H04L 67/303* (2013.01); *H04L 67/06* (2013.01); *H04L 67/10015* (2022.05)

(58) Field of Classification Search
CPC ......... H04L 67/14; H04L 67/10; H04L 67/06; H04L 67/303; H04L 29/06068
See application file for complete search history.

(56) References Cited

U.S. PATENT DOCUMENTS

| | | | |
|---|---|---|---|
| 10,366,086 B1* | 7/2019 | Conlon | ..................... G06F 7/08 |
| 2002/0021307 A1 | 2/2002 | Glenn et al. | |
| 2004/0167986 A1* | 8/2004 | Gilfix | ...................... H04L 67/02 709/230 |
| 2006/0277275 A1* | 12/2006 | Glaenzer | ................. H04L 69/18 709/219 |
| 2013/0322419 A1* | 12/2013 | Fedotenko | ............ H04W 4/029 370/338 |

(Continued)

*Primary Examiner* — Nicholas P Celani
(74) *Attorney, Agent, or Firm* — Stanek Lemon Crouse & Meeks, PA

(57) ABSTRACT

A method of connecting applications over a network can be provided by a connection profile broker that can determine that server metadata included in a server application instance and the client metadata included in a client application instance describe complementary functions and therefore may be appropriate for connection via the connection profile. To further determine this, the connection profile broker can determine whether the client application instance is related to the server application instance by at least one type of relationship that is included in the client scope metadata and further determines whether the server application instance is related to the client application instance by at least one type of relationship that is included in the server scope metadata. The connection profile broker can also be operatively coupled to a firewall, which can request information from the broker to determine whether the connection should be allowed.

19 Claims, 13 Drawing Sheets

(56) References Cited

U.S. PATENT DOCUMENTS

2014/0280535 A1\* 9/2014 Owens .................... H04L 67/14
   709/204
2021/0227032 A1\* 7/2021 Budiardjo ............... H04L 67/14

\* cited by examiner

METHODS OF CONNECTING CLIENT/SERVER APPLICATION INSTANCES IN DISTRIBUTED NETWORKS USING CONNECTION PROFILES, RELATED SYSTEMS AND ARTICLES OF MANUFACTURE

CROSS-REFERENCE TO RELATED APPLICATIONS

This application is a Continuation-in-Part of, and claims priority to, U.S. Non-provisional application Ser. No. 17/152,301, titled Methods Of Connecting Client/Server IoT Application Instances In Distributed Networks, Related Systems And Articles Of Manufacture Dynamically Connecting IoT Information Domains, filed on Jan. 19, 2021, in the U.S.P.T.O., and claims priority to U.S. Provisional Patent Application No. 63/284,939, titled Persistent Connections, filed on Dec. 1, 2021, in the U.S.P.T.O., and claims priority to U.S. Provisional Patent Application No. 62/961,890, titled Dynamically Connecting IoT Information Domains, filed Jan. 16, 2020, in the U.S.P.T.O., the entire disclosures of each of which are incorporated herein by reference.

FIELD

The invention relates to the field of computing in general, and more particularly, to connecting applications across networks.

BACKGROUND

The proliferation of connected devices and systems on the Internet, known as the Internet of Things, or IoT, is creating a tremendous opportunity and innovation for all manner of digital devices, cloud-based services, and software applications.

In the human-centric Internet, humans connect to services using a browser that they point to an address such as a bank, news or shopping sites. Humans do this using domain addresses such as chase.com or cnn.com. Once connected, information from the domain is transmitted to the human mainly using the HTML/HTTP Internet standards. Humans manage, use, and share these domain addresses through a combination of browser bookmarks, easy to remember domain names as well as links on emails, social media, and other means. The information delivered in this way is mostly for human consumption, such as readable text, images, and multimedia.

In the IoT arena, while some information is destined for human consumption, much more information is destined to be consumed by other IoT devices or systems that are similarly connected directly on the Internet or in some guarded private network for security or economic considerations. Many of these systems provide APIs (Application Programming Interface) by which they can communicate with other systems. The manner that these endpoints enable information to be shared using APIs varies significantly by using standards and protocols that are best suited to the information they need to convey. For example, a video camera endpoint would need to continuously stream packets of video images in real-time, whereas an infrared occupant sensor may send occasional notification events when something is detected, and a temperature sensor may make itself available for an inquiry by other endpoints when they need to know the temperature. Information may be sent in a proprietary or standard protocol depending on the needs, business model and application. There are thus numerous, potentially unlimited ways that endpoints could communicate with other endpoints.

In any exchange of information between parties, context is important. For humans, the context of using the Internet could be filing their annual taxes, planning for a vacation or working on a project at work. In this manner, a human can gather and manage the information they need to use for that context and get the best use of information available on the Internet for that purpose. For IoT, a context may also be relevant but the types of context are different. An IoT context is more likely to be a physical thing like a building containing thousands of devices and systems from multiple vendors; elevators, lighting, security cameras, heating, and A/C systems, etc. A context in IoT could be as small as a room in a building, a piece of equipment, or can be as large as a city, a ship or other entities.

SUMMARY

Embodiments according to the invention can provide methods of connecting client/server application instances in distributed networks using connection profiles, related systems and articles of manufacture. Pursuant to these embodiments, a method of connecting applications over a network can be provided by generating a server application instance that specifies server metadata that describes how information is provided by the server application to a connected client application instance that is connected to the server application instance over the network, generating a client application instance that specifies client metadata that describes how information that the client application instance uses is provided to the client application instance by a connected server application connected to the client application instance, selecting an established connection profile, using a connection profile broker, to provide a selected connection profile to connect the server application instance to the client application instance responsive to determining that a combination of the server metadata and the client metadata define a context for communication between the server application instance and the client application instance, generating a connection instance using the selected connection profile, wherein the connection instance specifies that the server application instance provides the information described by the server metadata to the client application instance and that the client application instance provides the information described by the client metadata to the server application instance and establishing a connection to transmit payload information between the server application instance and the client application instance over the network.

Further embodiments according to the invention can provide methods of connecting client/server application instances in distributed networks using persistent connection profiles, related systems and articles of manufacture. Pursuant to these embodiments, a method connecting applications over a network can be provided by selecting an established connection profile among a plurality of established connection profiles, using a connection profile broker, to provide a selected connection profile to connect a server application instance to a client application instance responsive to determining that a combination of server metadata for the server application instance and client metadata for the client application instance define a context for communication between the server application instance and the client application instance, generating a persistent connection instance between the server application instance and the client application instance using the selected connection profile, wherein the persistent connection instance specifies that the server application instance provides the information described by the server metadata to the client application instance and that the client application instance provides the information described by the client metadata to the server application instance, storing persistent connection instance information that identifies the persistent connection instance in a non-volatile storage system that is accessible to the connection profile broker, maintaining the persistent connection instance responsive to termination of operation of the connection profile broker, the client application instance, and/or the server application instance resulting in an indication that the persistent connection instance is inactive and re-establishing the persistent connection instance as active without re-registering both the client application instance and the server application instance.

DETAILED DESCRIPTION OF EMBODIMENTS ACCORDING TO THE INVENTION

Figure 1:
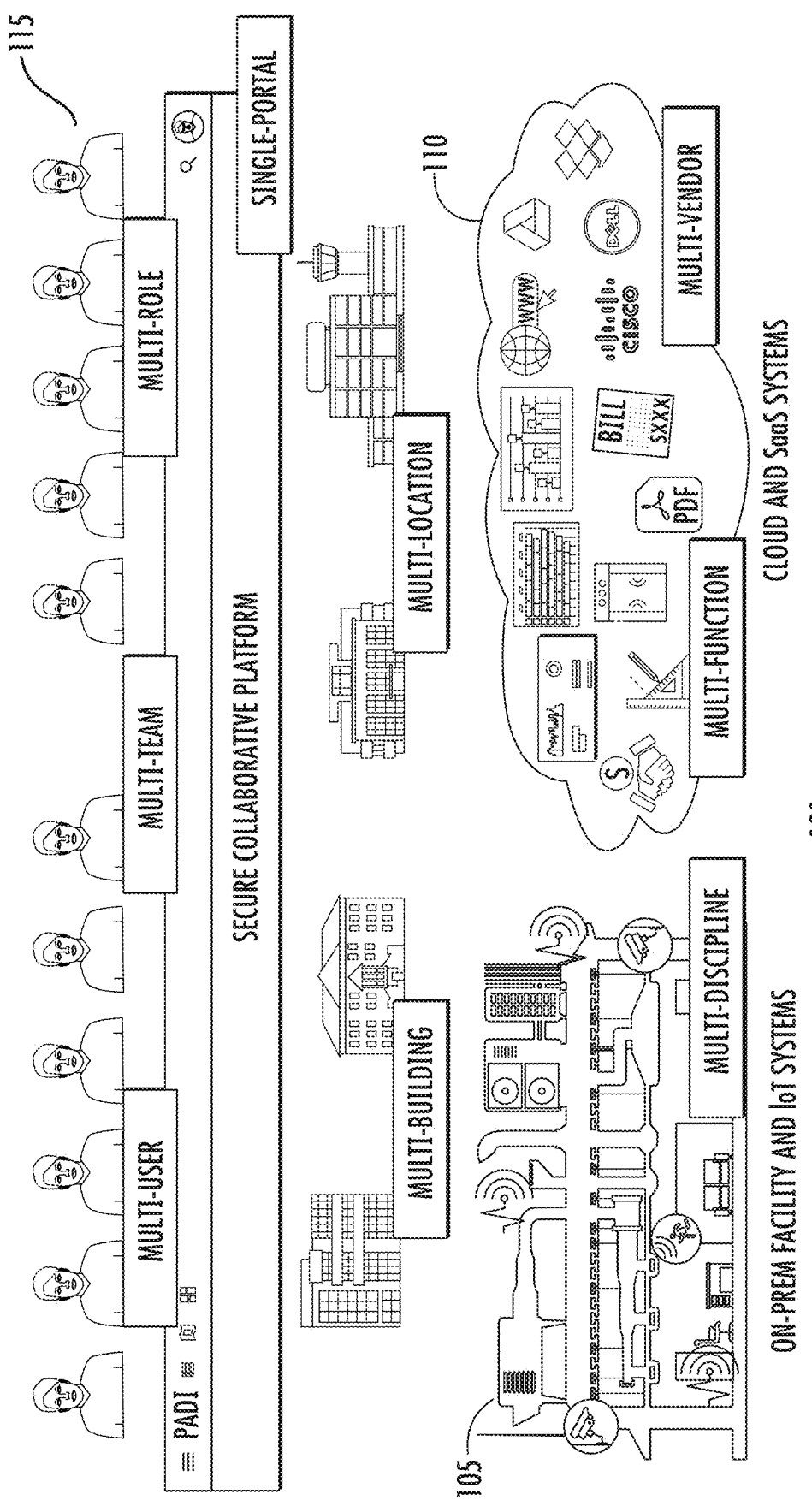
FIG. 1 is a block diagram illustrating a system of users allowed to access data from on-premises devices/systems and/or data from the cloud data related to the operation and management of IoT devices distributed across networks in some embodiments according to the invention.

The invention now will be described more fully hereinafter with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

It will be understood that although the figures and accompanying descriptions are related to users accessing data within, for example, a context of operation and management of multiple buildings across multiple locations and multiple disciplines etc., it will be understood that embodiments according to the present invention are not limited to the context of buildings. Accordingly, embodiments according to the present invention can apply to any context.

The Internet of things (IoT) is commonly use to describe a network of physical objects that are embedded with sensors, software, and other technologies for the purpose of connecting and exchanging data with other devices and systems over the Internet. As appreciated by the present inventor, however, the challenge that embodiments according to the invention may address is the need for one IoT system to be aware of, and able to use information from other IoT systems in service of the needs and scope of a specific context. This challenge may be further exacerbated because in many applications, IoT devices and systems come and go over the lifetime of the context and there is often no single entity that is responsible for all of the aspects of all of the devices and systems involved over such lifetime.

Because the context of an IoT system can be fundamentally in service of some human need, such as a maintenance or operation of a home or building, an industrial system or process, agriculture, manufacturing etc., embodiments according to the present invention can provide an information platform that allows users to define a context where IoT devices and systems will exist to perform that maintenance, operation, or other task (depending on the context). However, the vast number of IoT devices, applications, and contexts of use can present a significant barrier to the wide-spread adoption of IoT systems.

It will be understood that although embodiments according to the present invention are described herein with reference to IoT devices, systems, etc., embodiments according to the present invention may be used in any system where connections can be established between server applications and client applications.

It will be understood that although embodiments according to the present invention are described herein with reference to clients and servers, the description of some applications as a server and others as a client is for the purpose of clarity to illustrate the particular case. Accordingly, the terms server and client in the examples provided herein may be reversed so that the roles of server can be performed by the clients and vice-a-versa in some embodiments according to the invention.

As appreciated by the present inventor, embodiments according to the present invention can provide a system where compliant IoT systems and services, developed separately from but compliant with, applications (or other systems) may be automatically connected to one another by a broker that is included in the system. Accordingly, the development of IoT systems can avoid the need for a customized approach to integrate servers and clients by allowing the profile broker to connect the servers and clients at installation using a connection profile and respective metadata associated with the client and server applications. In particular, the profile broker can discover that the server and client are within a context for communication with one another by, for example, matching the name declared by client and the name declared by the server with the name of an established connection profile. The profile broker can then discover that other portions of the metadata for the client and server describe complimentary functions and describe an existing relationship between the client and server as being allowed by each. In response, the profile broker can create a connection instance which compiles the metadata of the client and server for use in generating a connection.

FIG. 1 is a block diagram illustrating a system 100 of users 115 allowed to access data from on-premises devices or systems 105 and/or data from the cloud-based or SaaS data 110 associated with the operation and management of IoT devices or systems distributed across networks in some embodiments according to the invention. According to FIG. 1, the system 100 can allow the IoT devices and/or systems, which may be distributed among multiple buildings and premises (105), to access multifunction or multi-vendor cloud-based systems that are distributed for example among multiple locations (110) by allowing connections 120. Accordingly, the users 115 can be organized into teams that can be defined according to a context for which the users/teams are responsible and, moreover, can be managed to limit or permit access based on the role that the user, team, or other context that the user operates within in some embodiments according to the invention.

Figure 2:
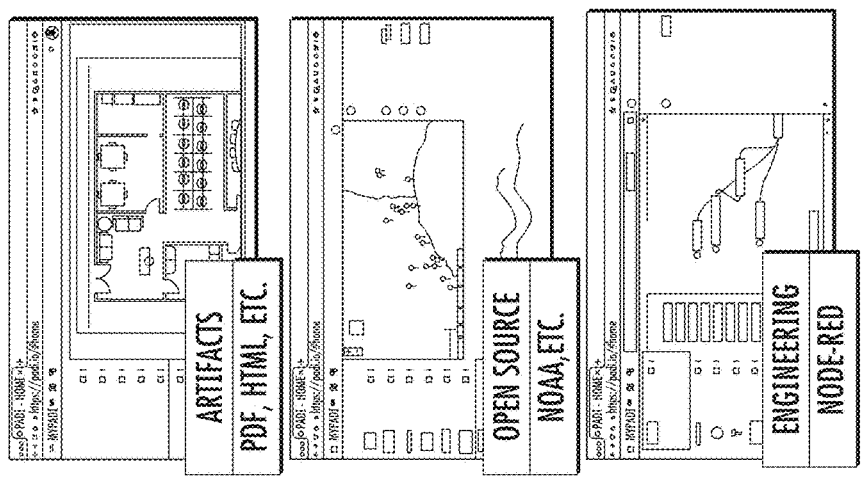
FIG. 2 is a schematic depiction of exemplary screen views provided to the users of FIG. 1 including examples of applications accessed by the users to carry out operations within the context in some embodiments according to the invention.

FIG. 2 is a schematic depiction of exemplary screen views provided to the users 115 of FIG. 1 including examples of applications accessed by the users 115 to carry out operations of the system 100 within the context shown therein in some embodiments according to the invention. According to FIG. 2, a home page can provide a first view for a user 115 of the system of FIG. 1 including the organization of the users 115 into Teams, the applications which are available to the user in operating the system 100, and various notifications that can be provided to the user that occur during operation of the system 100 within the context shown therein. As further shown in FIG. 2, various sub-screens can also be provided to the user such as viewers of floor plan layouts, weather data, engineering data etc. each of which can be provided to the user based on their role, for example, and can be provided by connections between applications as described herein.

Figure 3:
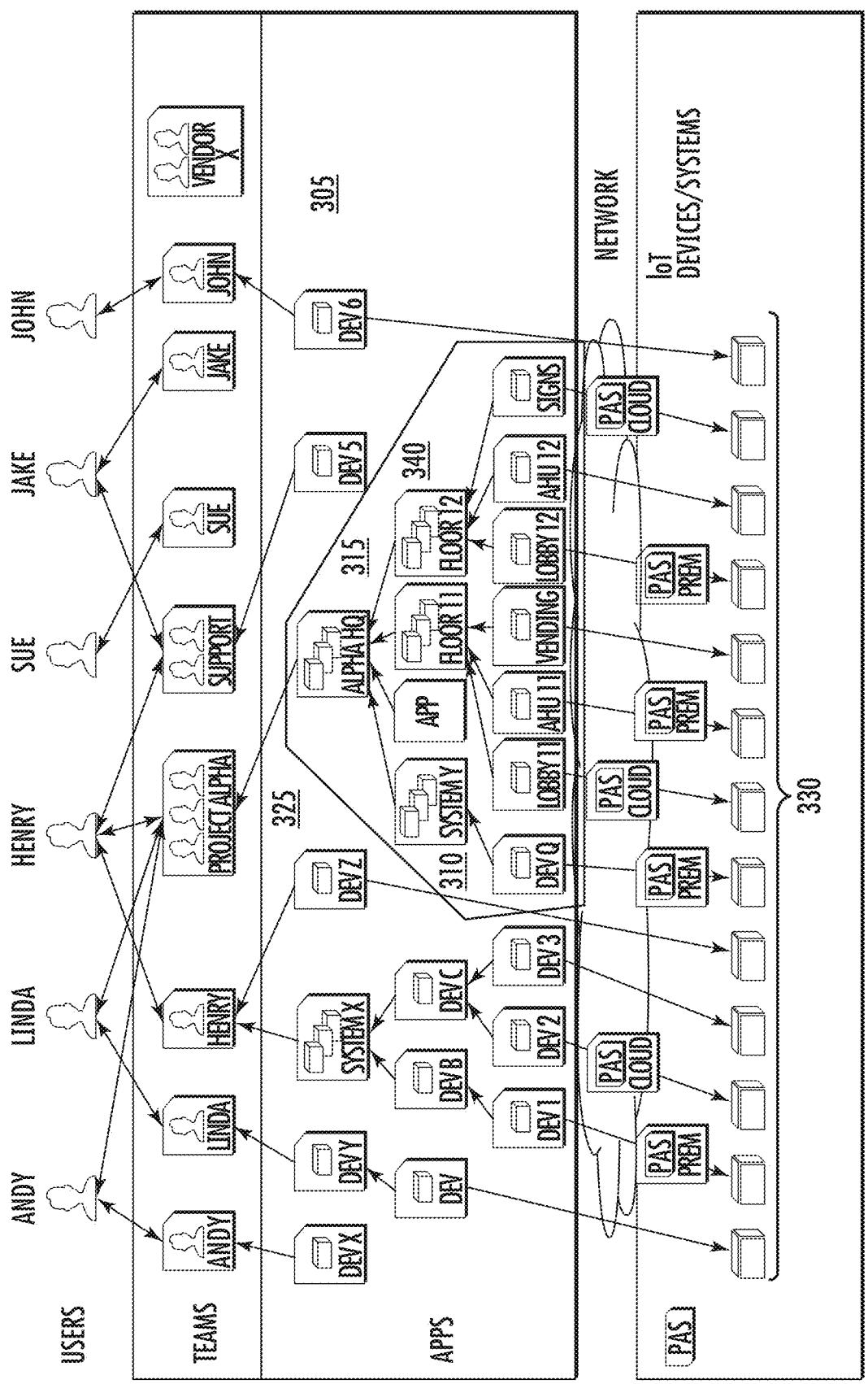
FIG. 3 is a block diagram illustrating client and server applications organized in a hierarchy of relationships to implement the system of FIGS. 1 and 2 to allow client and server application instances to be automatically connected according to a selected connection profile using a connection profile broker that is configured to recognize a context for communication between particular ones of the client and server application instances based on declarations within a naming convention and complementary metadata declarations having intersecting scoping mechanisms in some embodiments according to the invention.

FIG. 3 is a block diagram illustrating client and server application instances organized in hierarchies of relationships to implement the system of FIGS. 1 and 2 to allow client and server application instances 305 to be automatically connected according to a selected connection profile using a connection profile broker as part of the system 100 that is configured to recognize a context for communication between particular ones of the client and server application instances (for example 310 and 315) based on declarations within a naming convention and complementary metadata declarations having intersecting scoping mechanisms declaring allowed relationships (indicated by the arrows) in the hierarchy of relationships 325 in some embodiments according to the invention.

It will be understood that, in some embodiments according to the invention, the broker can be implemented in any form that allows the selection of a connection profile to connect client and server application instances such as a discrete entity (such as a server), a distributed set of set of servers (such as a cloud based service), a crowd-sourced brokerage service, a hub-and-spoke system, a message bus, or self-brokerage such as where client and server application instances discover other application instances to connect with using a connection profile selected by the self-brokerage client or server application instance. Other techniques may also be used to provide the broker as described herein.

According to FIG. 3, IoT systems and devices 330 can operate in any context, such as industrial systems, manufacturing systems, facilities management, etc. For example, in some embodiments, one context for the IoT systems and devices 330 can be a business office park development where the IoT systems and devices 330 can be actual systems and/or components of a system associated with parts of the business office park development, such as HVAC systems, lighting, security sensors and alarms, emergency power systems or the like.

As further shown in FIG. 3, the IoT systems and devices 330 are operatively coupled to respective ones of the application instances 305. It will be understood that the client and servers illustrated in FIG. 3 can be developed by independent entities without collaboration by developing the client or server to utilize a defined connection profile architecture that supports the standardization, interoperability, and subsequent development of compliant clients and servers. For example, a systems provider may develop a server application so that an instance thereof can declare its name and metadata that describes how information is provided by the server to a client application that connects to the server application. Furthermore, another systems provider may independently develop a client application so that an instance thereof can declare its name and metadata that describes how information is provided to the client by a server application that is connected to the client application.

In operation, when the client application and/or server application is installed in the system 100, a connection profile broker can perform a process whereby the declarations of the server application and/or client application described above are discovered. The connection profile broker can select an established connection profile (from among a range connection profiles) to connect the newly installed client or server with a compatible client or server application instance by examining the respective name and metadata declarations.

For example, in some embodiments according to the invention, if the name declared by a newly installed the server application 310 matches the declared name of an already installed client application 315, the connection profile broker can select a connection profile having that same declared name, then the connection profile broker can examine the declaration of the server and client 310 and 315 for how the server 310 provides information to a client 315 and how the client 315 declared information is to be received from the server 310 to determine if the server and client are compatible. In some embodiments according to the invention, the declaration of the how information is provided by the server to the client can be expressed as server metadata whereas the declaration of how the client 315 receives information from the server 310 can be expressed as client metadata.

In some embodiments according to the invention, if the connection profile broker determines that the server metadata and the client metadata are complementary to one another the selected connection profile may define a context for communication between the client application instance 315 and the sever application instance 310. For example, if the client application instance includes a declaration that it "uses" a particular type of information and the server application instance declares that it "has" a particular type of information, then the connection profile broker can determine that the client information and the server information are complementary if each of the respective information meets the need of the other.

Assuming that the conditions for the declarations described above are met, in further embodiments according to the invention, the profile connection broker can determine whether the client application instance 315 and the server application instances both declare allowed relationships that include one another. It will be understood that the above determination of allowed relationships for the client and the server is sometimes referred to herein as a "scoping mechanism." For example, in some embodiments according to the invention, the client may declare that it allows connections from server applications that are "children" of the client 315 within the hierarchy of relationships 325, whereas the server application instance 310 may declare that it allows connections from clients that are "parents."

As shown in FIG. 3, given the above particular client and server declarations, the connection profile broker can determine if the server application instance 310 is related to the client application instance 315 by one of the allowed relationships that the client instance permits. Accordingly, in the example, any server application instance that is located below the client 315 in the hierarchy of relationships 325 is a potential server application instance that may be connected to the client 315 (assuming that the declarations described above are also met) because all of those applications are children of the client 315, including the server 310.

Still referring to FIG. 3, the connection profile broker may also check to determine whether the client application 315 is related to the server 310 by a relationship that is allowed by the server 310. In the above example, therefore, the connection profile broker would determine that the connection between the client 315 and the server 310 is allowed using the selected connection profile given that the server 315 and the client 310 have met all of the conditions for the connection called for by the selected connection profile.

If however, in the above example, the client was client application instance 340, rather than 315, the connection profile broker would determine that the server application instance 310 is not a child of the client application instance 340 and that the client application instance 340 is not a parent of the server application instance 310. Accordingly, connection profile broker would not connect the server application instance 310 to the client application instance 340 even if the other declarations of the client and server described above did match and were complementary as the allowed relationships of declared by both the client and the server do not include one another within the hierarchy of relationships 325.

Once the client application instance and the server application instance are connected by the connection profile broker by the selected connection profile, the respective client and server application instances can maintain the information used for the connection between the server and the client application instances such as the server and client metadata, the metadata related to the scoping mechanism (sometimes referred to herein as the scoping metadata). It will be understood that in some embodiments according to the invention, the connection between the client application instance and the server application instance can be a direct connection such that the information transmitted between the client and the server via the connection is not passed by the system 100 that includes the connection profile broker. In some embodiments according to the invention, the connection between the client application instance and the server application instance can be an indirect connection such that the information transmitted between the client and the server via the connection is passed by the system 100 that includes the connection profile broker. In some embodiments according to the present invention, the connection profile broker can facilitate continued operations described above when, for example the server or the client update the respective metadata used by the client application instance and the server application instance. Accordingly, the connection profile broker can provide the updated metadata to the connection instance for the connection between the client application instance and the server application instance (for example, 315 and 310).

Figure 4:
FIG. 4 is a schematic representation of an example connection profile configured for operation within the system of FIGS. 1 and 4 for selection to a connection instance between server application instance and client application instances in some embodiments according to the invention.
Figure 5:
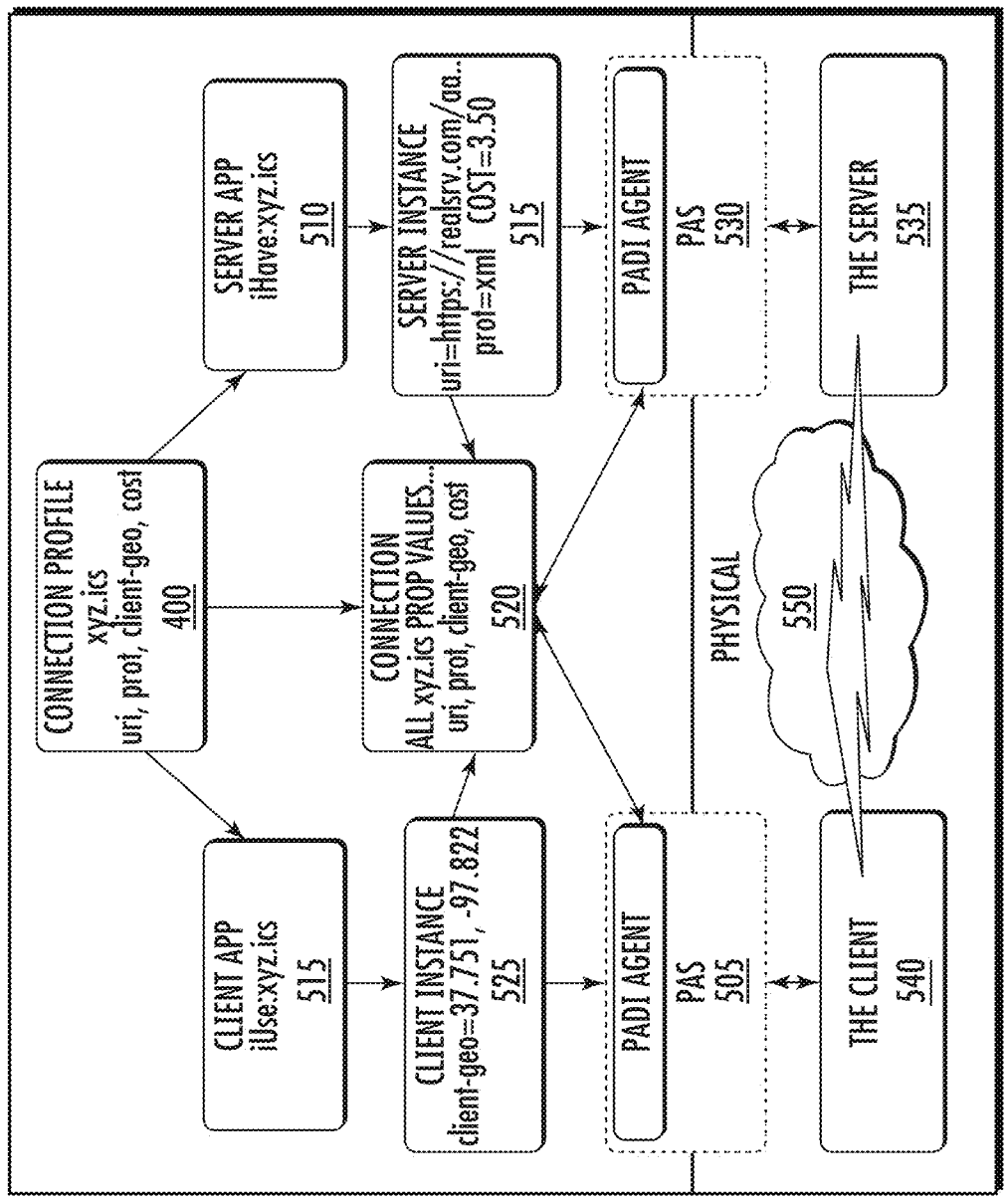
FIG. 5 is a block diagram illustrating operations of the connection profile broker within the system of FIG. 1 to select a connection profile for the context for communication between a server application instance and client application instance to generate a connection instance to establish a connection between the server application instance and client application instance in some embodiments according to the invention.

FIG. 4 is a schematic representation of an example connection profile 400 configured for operation within the system 100 of FIGS. 1 and 5 for selection to generate a connection instance between particular server and client application instances in some embodiments according to the invention. According to FIG. 4, the connection profile 400 can include a header the declares a name of the connection profile XYZ.ICS, and other information, such as a version number of the connection profile, the name of the connection profile developer, the types of servers and clients which may utilize the connection profile to connect to one another, the date when the current version of the connection profile was first made public in the system 100, the status of the connection profile etc.

It will also be understood that the header shown in FIG. 4 is an example and may include other data or less data in some embodiments. It will also be understood that the connection profile 400 shows a data structure that defines the structure of the data used to create a connection instance between the client and server instances and therefore is may be used by any number of client and server applications when instantiating the respective instance thereof.

As further shown in FIG. 4, the connection profile 400 can include declarations of metadata that are to be provided by the client and server when the connection profile is used to connect particular clients to particular servers. For example, The connection profile 400 shows 4 declarations of metadata as: Uri (location of the server), PROT (protocol used by the server), and cost (cost associated with use of the server). As shown, each of these metadata is identified as being provided by a client or server and is further described in the metadata as being required or mandatory or optional. A narrative can also be provided giving a description of the connection profile.

In operation, the connection profile 400 is registered as an established connection profile which is available for use within the system 100. When a developer creates a client or server application for use in the system 100, it can utilize, for example, a software development kit or application programming interface, that allows that client or server application (when instantiated) to be utilized by another client or server that is configured to use the same connection profile even though that other client or server was created independently by another developer.

It will be understood that the developers of clients and servers will declare those applications using the name declared in the header of the corresponding connection profile (e.g., XYZ.ICS) so that the connection profile broker can readily identify which clients and servers may potentially be connected to one another using the connection profile. For example, according to FIG. 4, if a developer would like to use a particular connection profile to connect a server application with other developers' current or later client applications in the system 100, then the developer can incorporate an API that allows those client applications use the server application as specified in the connection profile.

As further illustrated in FIG. 4 the connection profile 400 further specifies metadata that a client or server application provides when connected using the connection profile 400. For example, the connection profile 400 specifies that metadata 405, 410, and 420 are provided by a server application which connects to a client. In contrast, the connection profile 400 specifies that metadata 420 is provided by the client application. Accordingly, when the connection profile 400 is used to connect a server application instance to a client application instance all of the metadata 405, 410, 420, and 415 specified by the connection profile 400 are provided by a combination of the server application instance and the client application instance.

FIG. 5 is a block diagram illustrating operations of the connection profile broker within the system 100 of FIG. 1 to select the connection profile 400 of FIG. 4 for a context for communication between a server application instance 515 and client application instance 525 to generate a connection instance 520 to establish a connection 550 between the server application instance 535 and client application instance 540 in some embodiments according to the invention. As shown in FIG. 5, the server application 510 is provided in compliance with the connection profile 400 described above in FIG. 4. In particular, the server application 510 can provide metadata called for from a server application as described in the connection profile 400 including a first portion as a reference to the declared name of the connection profile (e.g., XYZ.ICS).

The metadata for the server application 510 also includes a declaration of the function that the server application provides (e.g., iHave) that describes how information is provided by the server application instance 515 to a connected client application instance when connected to the server application instance 515. Still further, the server metadata also includes a second portion referred to as server scope metadata that describes each type of relationship that is allowed between the server application instance and another application instance within the hierarchy of relationships operated by the system 100.

When the server application 510 is installed in the system 100, the server application instance 515 is instantiated, which also declares the particular server metadata for this particular instance of the server application 510. In particular, the server application instance 515 declares that particular values for the data that is described by the server metadata, as shown. For example, the particular server metadata can include the actual cost for use of the server application instance, the protocol that is used for communication with the server application instance 515, as well as scope metadata that describes, for example, that a client application can connect to the server application instance 515 if the client application instance is a parent, a child, a sibling etc. of the server application instance 515.

As further shown in FIG. 5, the client application 515 is also provided in compliance with the connection profile 400 described above in FIG. 4. In particular, the client application 515 can provide metadata called for from a client application as described in the connection profile 400 including a first portion as a reference to the declared name of the connection profile (e.g., XYZ.ICS). The metadata for the client application 515 also includes a declaration of the function that the client application provides (e.g., iUse) that describes how information that is used by the client is provided by the server application instance 525. Still further, the client metadata also includes a second portion referred to as client scope metadata that describes each type of relationship that is allowed between the client application instance 525 and another application instance within the hierarchy of relationships operated by the system 100.

When the client application 515 is installed in the system 100, the server application instance 525 is instantiated, which also declares the particular client metadata for this particular instance of the client application 515. In particular, the client application instance 525 declares that particular values for the data that is described by the client metadata, as shown. For example, the particular client metadata can include the metadata Geo (location data) of the client application instance 525 as well as the client scope metadata that describes, for example, that a server application can connect to the client application instance 515 if the server application instance 515 is a parent, a child, a sibling etc. of the client application instance 525.

The connection profile broker can discover the existence of the server application instance 515 and the client application instance 525 within the system 100 and determine whether an established connection profile is available to connect these application instances together. In particular, the connection profile broker can discover that the client application instance 525 and the server application instance 515 both refer to the declared name used by the connection profile 400 (e.g., XYZ.ICS).

The connection profile broker determines that the server metadata included in the server application instance 515 and the client metadata included in the client application instance 525 describe complementary functions and therefore may be appropriate for connection via the connection profile 400. To further determine this, the connection profile broker determines whether the client application instance 525 is related to the server application instance 515 by at least one type of relationship that is included in the client scope metadata and further determines whether the server application instance 515 is related to the client application instance 525 by at least one type of relationship that is included in the server scope metadata.

If the connection profile broker determines that both of the above determinations are true then a connection instance 520 is created that includes the client metadata and the server metadata to connect the server 535 with the client 540 via a connection 550. It will be understood that the connection 550 maybe established so that the information transmitted between the client 540 and the server 535 is not passed by the system 100 including the connection profile broker.

Alternatively, in some embodiments according to the invention, the system 100 can include a server agent 530 the couples the server application instance 535 to the connection instance 520 and a client agent 505 that couples the client instance 540 to the connection instance 520 so that the system 100 is at least partially involved in the transmission of information. In particular, in some embodiments according to the invention, the connection 550 can carry some of the information between the server 535 and the client 540, whereas other information can be passed to/from the server 535 and the client 540 through the system 100 via the server and client agents 535 and 540. In some embodiments according to the invention, both agents may be present or only one of the agents shown in FIG. 5 may be present.

Figure 6:
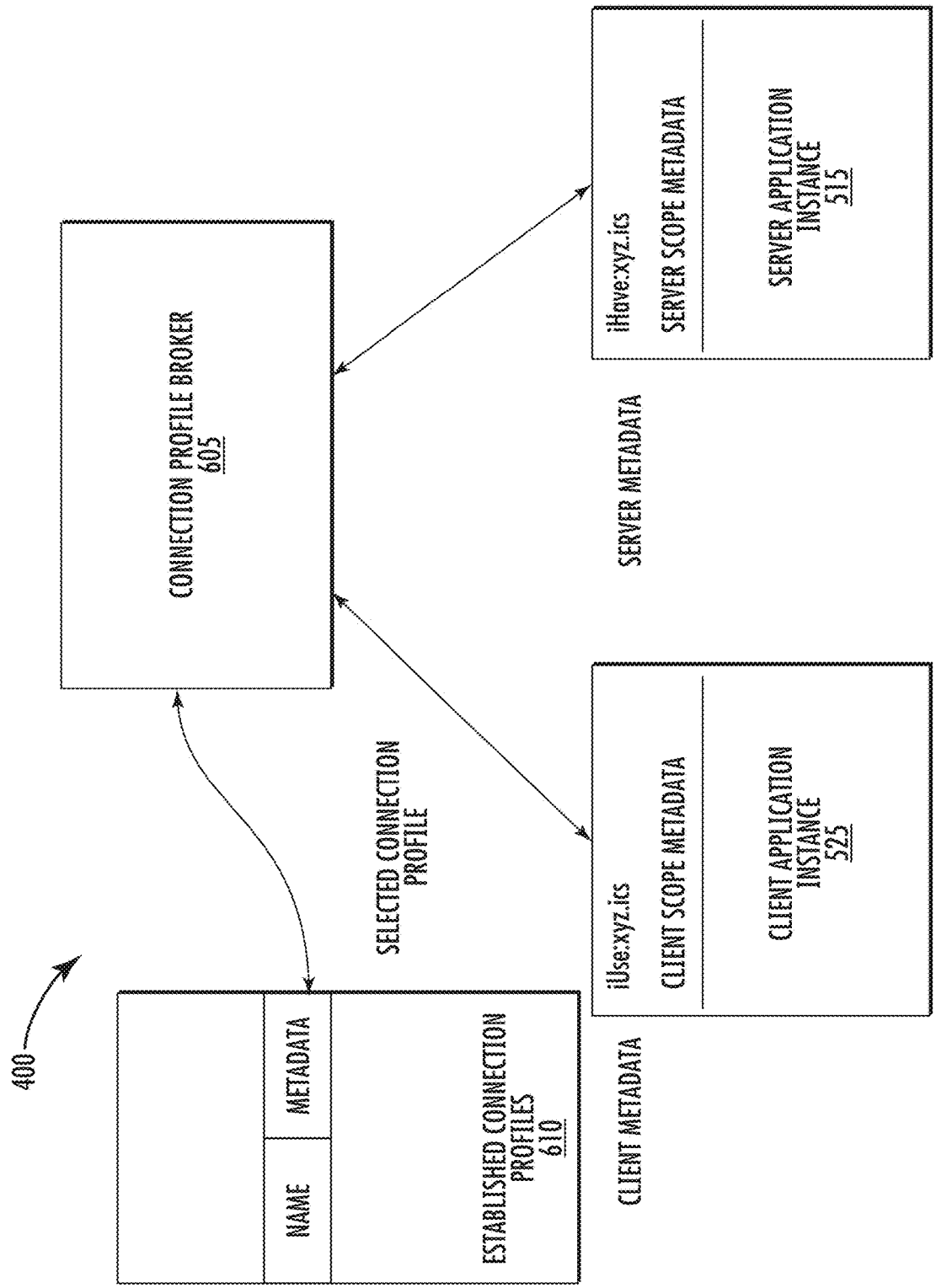
FIG. 6 is a block diagram illustrating the selection of a connection profile for use in generating a connection instance between a server application instance and a client application instance declaring matching names and respective complementary function metadata provided to the selected connection profile in some embodiments according to the invention.

FIG. 6 is a block diagram illustrating operations of the connection profile broker 605 to select the connection profile 400 for use in generating the connection instance 520 between the server application instance 515 and the client application instance 525 with respective client and server metadata that describes the name of the connection profile to be used, complementary functions for the server and client, and each type of relationship that is allowed between the respective application and another within the hierarchy of relationships for the connection instance 520 in some embodiments according to the invention.

According to FIG. 6, the server application instance 515 and the client application instance 525 are generated and each includes respective declarations of the server metadata and client metadata as shown. The server metadata includes, for example, the declaration of the name of the connection profile 400 to be used for connections to the server application instance 155 as well as a declaration of the function that is provided by the server application instance 515 (i.e., iHave). Similarly, the client metadata includes a declaration of the name of the connection profile 400 as well as the declaration of a function that is complementary to that provided by the server metadata. In other words, while the server metadata declares the functionality as iHave, the client metadata this declares the function as iUse.

Accordingly, the connection profile broker 605 can determine that the names declared by the client application instance 525 and the server application instance 515 match the name of the profile 400 described above in FIG. 4, which is shown listed in a database 610 of established connection profiles 610.

As further shown in FIG. 6, the connection profile broker 605 can also examine the server scope metadata for the sever application instance 515 and the client scope metadata for the client application instance 525. If the connection profile broker 605 determines that the client application instance 525 is related to the server application instance by at least one type of relationship that is included in the client scope metadata and further that the server application instance 515 is related to the client application instance by at least one type of relationship that is included in the server scope metadata then the connection profile broker 605 can connect the server application instance 515 to the client application instance 525 using the connection profile 400 selected from among the established connection profiles in the database 610.

Figure 7:
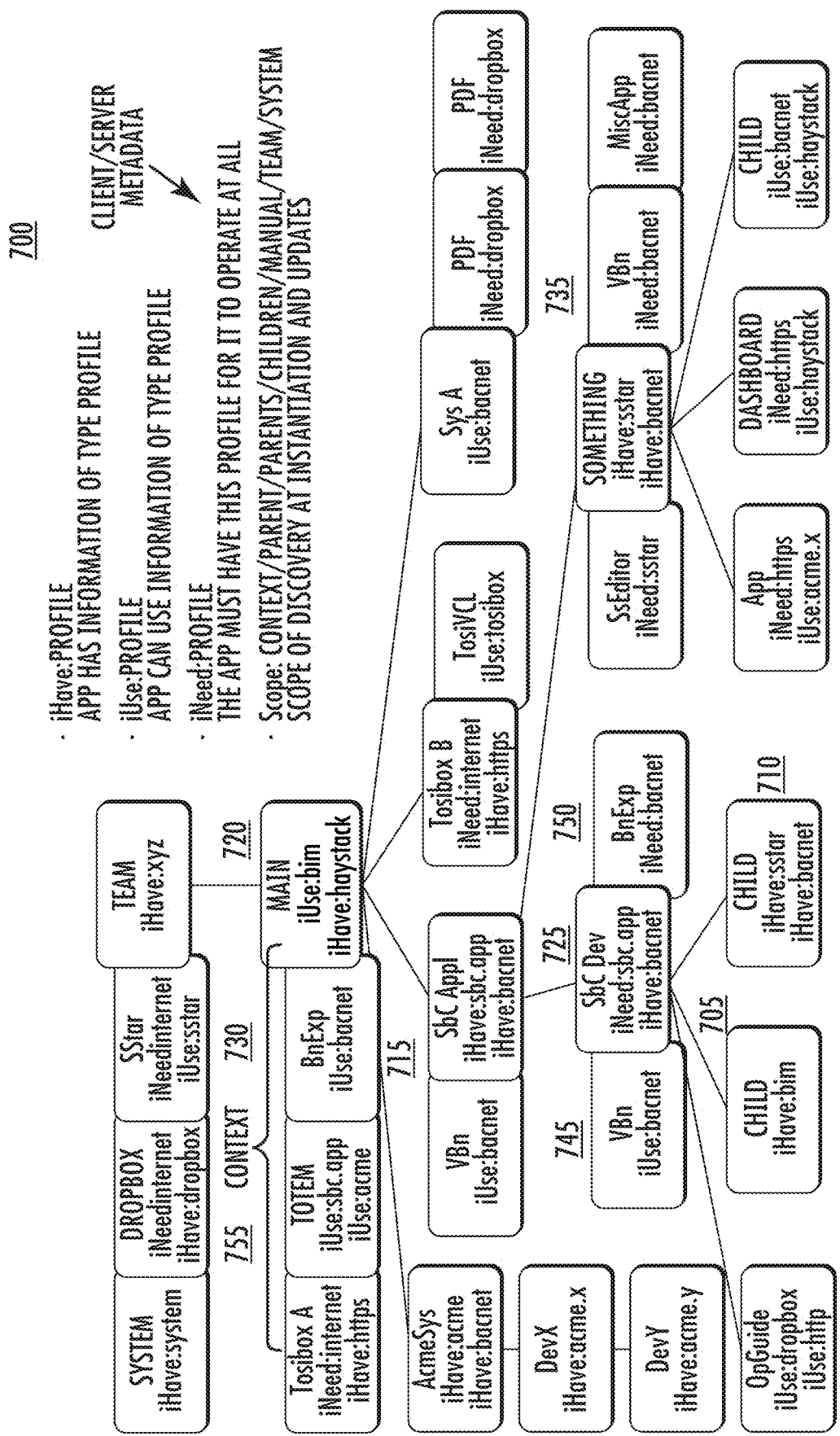
FIG. 7 is a schematic diagram illustrating respective names and metadata declaring complementary functions and scope metadata for application instances within a hierarchy of relationships operatively coupled to the system of FIG. 1 in some embodiments according to the invention.

FIG. 7 is a schematic diagram illustrating respective names and metadata declaring complementary functions and scope metadata for application instances (client and servers) within a hierarchy of relationships 700 operatively coupled to the system of FIG. 1 in some embodiments according to the invention. According to FIG. 7, the hierarchy of relationships 700 includes a tree of applications whose relationships are designated by the solid lines connecting the series of layers within the hierarchy 700. It will be understood that if a server application and a client application are located with the hierarchy 700, the server and client may potentially be connected using a connection profile if the server is related to the client by one of the relationships that is allow between the server and other applications and if the client is related to the server by one of the relationships that is allow between the client and other applications in the hierarchy 700.

For example, application 705 is a child of application 725. Further, application 710 is also a child of application 725. Therefore, application 705 and the application 710 have a relationship of "siblings" given that both applications have the same parent application 725. As further shown in FIG. 7, the application 715 is a parent of both the application 725 and applications 705 and 710. Therefore, the relationship between the application 715 and applications 705 and 710 is that of "parents" given that there are multiple layers of applications that are parents to both applications 705 and 710. Similarly, application 720 is also defined as a parent of applications 715, 725, and 705 and 710.

Still referring to FIG. 7, in some embodiments according to the invention, applications located at the same level in the hierarchy 700 which are also related to one another can be defined as being within the same "context." Accordingly, as shown in FIG. 7, application 720 can be within the same "context" as application 730 and application 755 whereas applications 745 and 750 can be within the same context as application 725.

As further shown in FIG. 7, each of the applications also includes a declaration of the connection profile to be used to connect with that application and a declaration of the metadata that describes the how the information is provided or is received (depending on the role as the client or server application). Accordingly, the server application instance 705 (iHave:bim) may potentially be connected to the client application instance 720 (iUse:bim) using the connection profile "bim" because the connection profile name declarations match one another and the metadata describing how the server application instance 705 provides information to the client application instance 720 (iHave) is complementary to how information is to be provided by the server application (iUse) to the client.

As a further example, given that the client application instance 730 (iUse:bacnet) is within the "context" of client application 720, the server application instance 710 (iHave:bacnet) may potentially be connected to the client application instance 730 (iUse:bacnet) using the connection profile "bacnet" because the connection profile name declarations match one another and the metadata describing how the server application instance 710 provides information to the client application instance 730 (iHave) is complementary to how information is to be provided by the server application (iUse) to the client.

Similarly, given that client application instance 730 (iUse:bacnet) is within the "context" of client application 720, the server application instance 710 (iHave:bacnet) may potentially be connected to the client application instance 730 (iUse:bacnet) using the connection profile "bacnet" because the connection profile name declarations match one another and the metadata describing how the server application instance 710 provides information to the client application instance 730 (iUse) is complementary to how information is to be provided by the server application 710 (iHave) to the client 730. As further shown in FIG. 7, the Dropbox application can specify iHave as Dropbox folder login credentials used to access the Dropbox folder, while the Dropbox application can specify iNeed as the Internet to indicate that the Dropbox application needs access to the Internet to access the Dropbox folder using the Dropbox folder login credentials.

Figure 8:
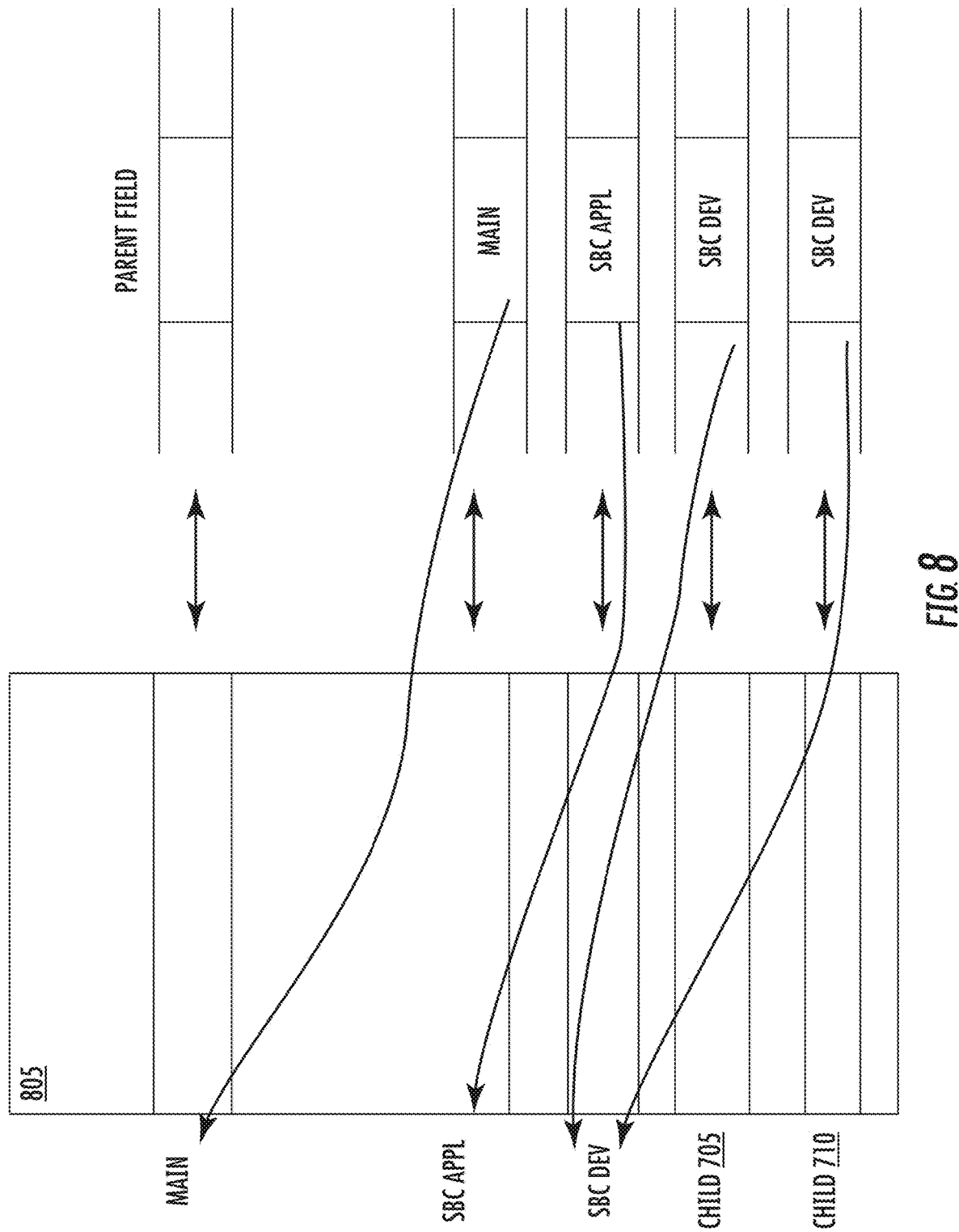
FIG. 8 is a block diagram illustrating operations of the connection profile broker to the determine whether the client application instance is related to the server application instance by at least one type of relationship that is included in the scope metadata of client application instance and that the server application instance is related to client application instance by at least one type of relationship that is included in the scope metadata of server application instance in some embodiments according to the invention.

FIG. 8 is a block diagram illustrating operations of the connection profile broker 605 to the determine whether the client application instance 525 is related to the server application instance 515 by at least one type of relationship that is included in the client scope metadata and that the server application instance 515 is related to client application instance by at least one type of relationship that is included in the server scope metadata in some embodiments according to the invention. In particular, the connection profile broker 605 can examine direct and indirect references that establish a connection between a client application instance and a server application instance.

According to FIG. 8, the connection profile broker 605 can access a database 805 that includes records for each of the application instances shown in the hierarchy 700 in some embodiments according to the invention. Each record for an application instance includes a parent field that includes a direct reference to the parent of that application instance. Although an application instance can have only one parent, it will be understood that application instances that are within the context of that application instance can be considered equivalent to a parent for the purposes of the scoping mechanism.

As further shown in FIGS. 7 and 8, the child 705 and the child 710 each include a direct reference in the parent field of the record to SBC Dev as the parent. Also, the parent field of the SBC Dev record includes a direct reference to SCB Appl (as the parent application). Similarly, the parent field of the SBC Appl record includes a direct reference to Main (as the parent application). This relationship enables the connection profile broker to determine the relationships between each of the applications in the hierarchy 700. For example, the references in the parent records described above identify which applications are children of which of the applications and also which applications are parents, siblings, uncles, etc. where uncles are siblings of a parent of a child. It will also be understood that the scope can include "parents" which includes any multi-level relation connected to an application by a contiguous link in the hierarchy of relationships.

Furthermore, the references in the parent records described above identify which relationships among multiple levels by identifying the indirect references which are made up of a contiguous series of direct references. For example, as shown in FIGS. 7 and 8, Child 705 is the great grandchild of Main 720 because the connection between Child 705 and Main 720 comprises a series of direct references as shown in the database 805.

Given that the connection profile broker 605 can determine the relationships between the applications in the hierarchy 700 as described above, it can be determine if 1) the client application instance is related to the server application instance by at least one type of relationship that is included in the client scope metadata and if 2) the server application instance is related to the client application instance by at least one type of relationship that is included in the server scope metadata. If the existing relationship between the server application instance and the client application instance is such that both of the above conditions are true, then the connection profile broker 605 selects the connection profile to generate the connection instance so that the connection can be established between the client and server.

For example, referring to FIGS. 7 and 8, if the client scope metadata for SBC Appl 715 is "child" for iUSe:BACNet, and the server scope metadata for Child 710 is "parents" for iHave:BACnet, then the connection profile broker 605 can connect Child 710 and SBC Appl 715 for BACnet as the client application instance is related to the server application instance by at least one type of relationship ("child") that is included in the client scope metadata and the server application instance is related to the client application instance by at least one type of relationship ("parents") that is included in the server scope metadata.

Figure 9:
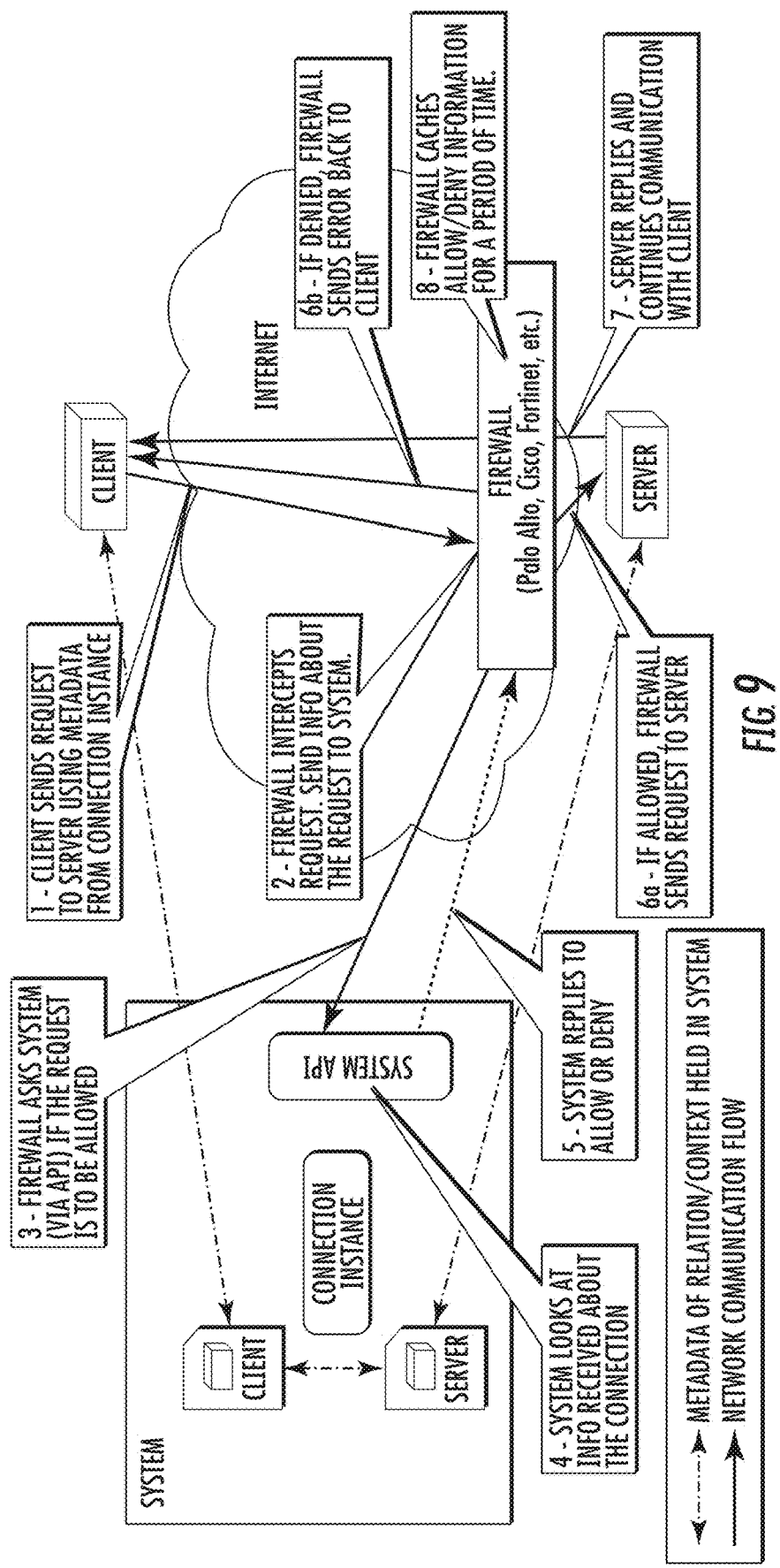
FIG. 9 is a block diagram of a direct connection operatively coupled to a firewall configured to determine whether requests to the server application instance should be blocked in some embodiments according to the invention.

FIG. 9 is a block diagram of the direct connection of FIG. 9 operatively coupled to a firewall configured to determine whether requests to the server application instance should be blocked in some embodiments according to the invention. According to FIG. 9, the client application instance sends a request to the server application instance using metadata from the connection instance (Block 1). The firewall intercepts the request from the client application instances and transmits a request to the system 100 for information regarding the validity of the request (block 2). The firewall asks the system 100, via an API, if the request from the client application instance is to be allowed (block 3).

The system 100 examines the information received regarding the connection (block 4) and the transmits a reply indicating whether the request from the client application instance should be blocked (block 5). The firewall then blocks or allows the request based on the response from the system 100. If the firewall allows the request to the server application instance (block 6A), the request from the client application instance is forwarded to the server application instance and the server application instance sends a reply to the client application instance (block 7). If the request is blocked (block 6B) the firewall transmits an error back to the client application instance and the firewall caches information regarding the decision to allow or block the request for a period of time.

Figure 10:
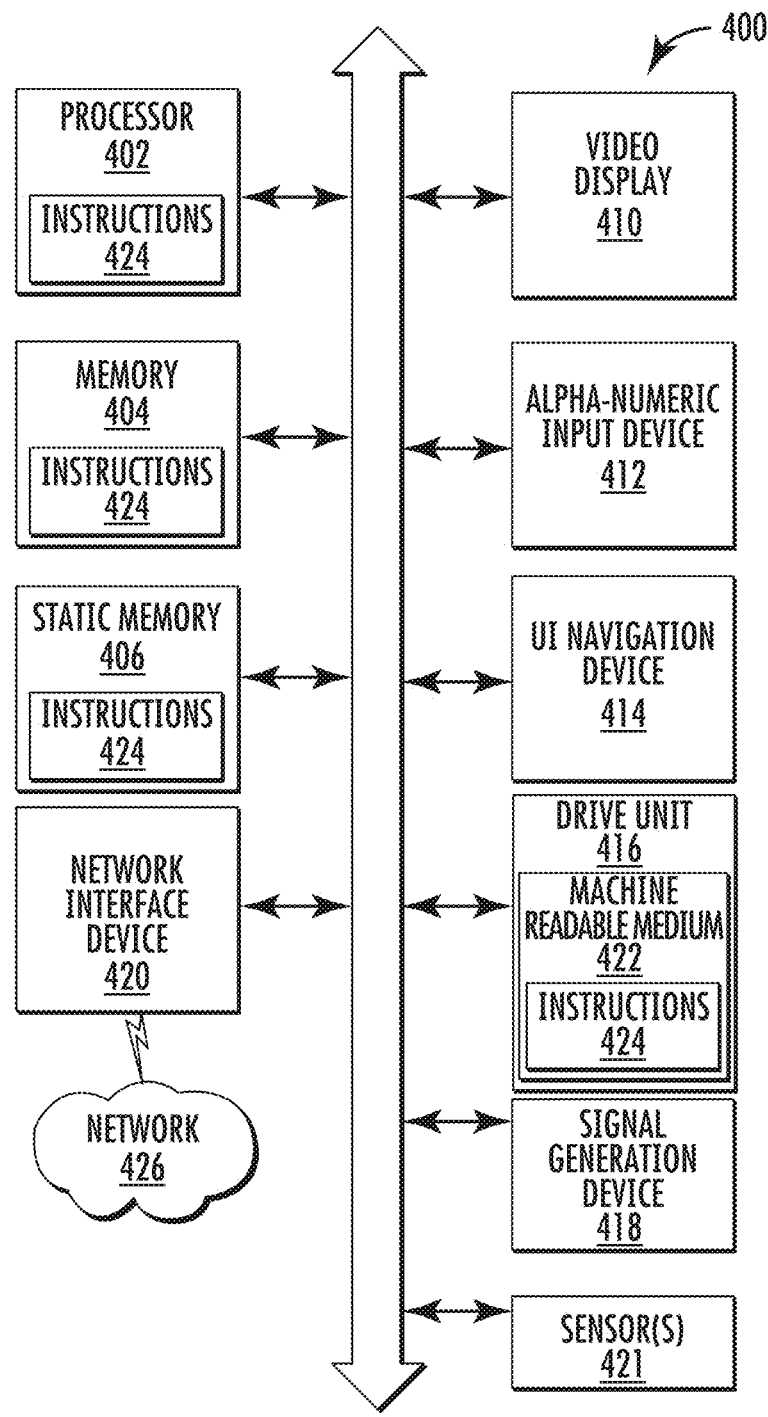
FIG. 10 is a block diagram of a computing system configured to execute stored instructions to provide the operations described herein in reference to FIGS. 1-10 in some embodiments according to the invention.

FIG. 10 is a block diagram of a computing system configured to execute stored instructions to provide the operations described herein in reference to FIGS. 1-9 in some embodiments according to the invention. FIG. 10 is a block diagram illustrating an example of a machine upon which one or more aspects of embodiments of the present invention can be implemented. For example the block diagram of FIG. 10 illustrates a computing system that can be used to perform processor-executable instructions represented by non-transitory processor-readable media to carry out the operations shown in FIGS. 1-9 in some embodiments according to the invention.

Examples of machine 401 can include logic, one or more components, circuits (e.g., modules), or mechanisms. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, at a later time, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor-implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processors executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

The computing system can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine 401) and software architectures that can be deployed in example embodiments.

In an example, the machine 401 can operate as a stand-alone device or the machine 401 can be connected (e.g., networked) to other machines. In a networked deployment, the machine 401 can operate in the capacity of either a server or a client machine in server-client network environments. In an example, machine 401 can act as a peer machine in peer-to-peer (or other distributed) network environments. Further, while only a single machine 401 is illustrated, the term "machine" shall also be taken to include any collection of machines that individually or jointly execute a set (or multiple sets) of instructions to perform any one or more of the methodologies discussed herein.

Example machine (e.g., computer system) 401 can include a processor 402 (e.g., a central processing unit (CPU), a graphics processing unit (GPU) or both), a main memory 404 and a static memory 406, some or all of which can communicate with each other via a bus 408. The machine 401 can further include a display unit 410, an alphanumeric input device 412 (e.g., a keyboard), and a user interface (UI) navigation device 411 (e.g., a mouse). In an example, the display unit 810, input device 417 and UI navigation device 414 can be a touch screen display. The machine 401 can additionally include a storage device (e.g., drive unit) 416, a signal generation device 418 (e.g., a speaker), a network interface device 420, and one or more sensors 421, such as a global positioning system (GPS) sensor, compass, accelerometer, or other sensor.

The storage device 416 can include a machine readable medium 422 on which is stored one or more sets of data structures or instructions 424 (e.g., software) embodying or utilized by any one or more of the methodologies or functions described herein. The instructions 424 can also reside, completely or at least partially, within the main memory 404, within static memory 406, or within the processor 402 during execution thereof by the machine 401. In an example, one or any combination of the processor 402, the main memory 404, the static memory 406, or the storage device 416 can constitute machine readable media.

While the machine readable medium 422 is illustrated as a single medium, the term "machine readable medium" can include a single medium or multiple media (e.g., a centralized or distributed database, and/or associated caches and servers) that configured to store the one or more instructions 424. The term "machine readable medium" can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" can accordingly be taken to include, but not be limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 424 can further be transmitted or received over a communications network 426 using a transmission medium via the network interface device 420 utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present. It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The invention is also described using flowchart illustrations and block diagrams. It will be understood that each block (of the flowcharts and block diagrams), and combinations of blocks, can be implemented by computer program instructions. These program instructions may be provided to a processor circuit, such as a microprocessor, microcontroller or other processor, such that the instructions which execute on the processor(s) create means for implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks.

Accordingly, the blocks support combinations of means for performing the specified functions, combinations of steps for performing the specified functions and program instruction means for performing the specified functions. It will also be understood that each block, and combinations of blocks, can be implemented by special purpose hardware-based systems which perform the specified functions or steps, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Computer program code or "code" for carrying out operations according to the present invention may be written in an object oriented programming language such as JAVA®, Smalltalk or C++, JavaScript, Visual Basic, TSQL, Perl, or in various other programming languages. Software embodiments of the present invention do not depend on implementation with a particular programming language. Portions of the code may execute entirely on one or more systems utilized by an intermediary server.

The code may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the Internet (e.g., via an Internet Service Provider). It is understood that the present invention is not TCP/IP-specific or Internet-specific. The present invention may be embodied using various protocols over various types of computer networks.

It is understood that each block of the illustrations, and combinations of blocks in the illustrations can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block and/or flowchart block or blocks.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

Embodiments according to the invention can operate in a logically separated (or physically separated) client side/server side-computing environment, sometimes referred to hereinafter as a client/server environment. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated.

Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a web browser, that requests information, such as web pages, from a server under the control of a user. An example of a client includes Internet Explorer® (Microsoft Corporation, Redmond, Wash.). Browsers typically provide a graphical user interface for retrieving and viewing web pages, web portals, applications, and other resources served by Web servers, A SOAP client can be used to request web services programmatically by a program in lieu of a web browser.

The applications provided by the service providers may execute on a server. The server can be a program that responds to the requests from the client. Some examples of servers are the Apache server and Microsoft's Internet Information Server (IIS) (Microsoft Corporation, Redmond, Wash.).

The clients and servers can communicate using a standard communications mode, such as Hypertext Transport Protocol (HTTP) and SOAP. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

As described herein, the Connection Profile mechanism can provide a predictable and scalable way to establish connections between two systems within a broader system such as the Internet, or a defined local system. When systems connect using a Connection Profile, an instance of the Connection Profile is created for the purpose of transferring information between the two systems in accordance with the definition of the Connection Profile used to create the connection instance. Specifically, the Connection Profile lists Properties that each system provides to the other system in an asymmetric manner identifying the two systems as a Client and Server systems.

The Connection instances between the systems are orchestrated by the Broker that initially matches compatible Connection Profiles, one system being a Client the other as a Server. Once systems are connected by the Broker, the Broker may be responsible for the transfer of information between the instances of the Client and Server systems in accordance with the defined properties of the Connection Profile selected by the Broker to provide the connection instance.

In some embodiments according to the present invention, the information is held by the broker temporarily where, for example, when the Broker provides a communication path between the two systems included in the connection. If the Broker is active, the information that represents the connection instance between the server and client application instances using the Connection profile is maintained. In the event, however, that the Broker is restarted for whatever reason, the information held by the Broker is lost and the Broker is unaware of the connection instances that existed prior to the restart. Accordingly, all client and server applications connected by the connection instance established by the Broker's selection of the Connection profile would re-connect by declaring the respective existences to the Broker, which would in-turn select the Connection profile (as described herein) in order to re-establish a (new) connection instance between the client and server application instances.

Similarly, in some embodiments according to the present invention, if the client application instance and/or the server application instance were to terminate, then the information that represents the connection instance between the server and client application instances using the Connection profile is also lost. Accordingly, when the client application instance and/or the server application instance is restored, the Broker detects the client application instance and/or the server application instance declaration of the Connection profile whereupon the Broker can select the Connection profile to re-establish the connection instance between the client application instance and the server application instance.

Figure 11:
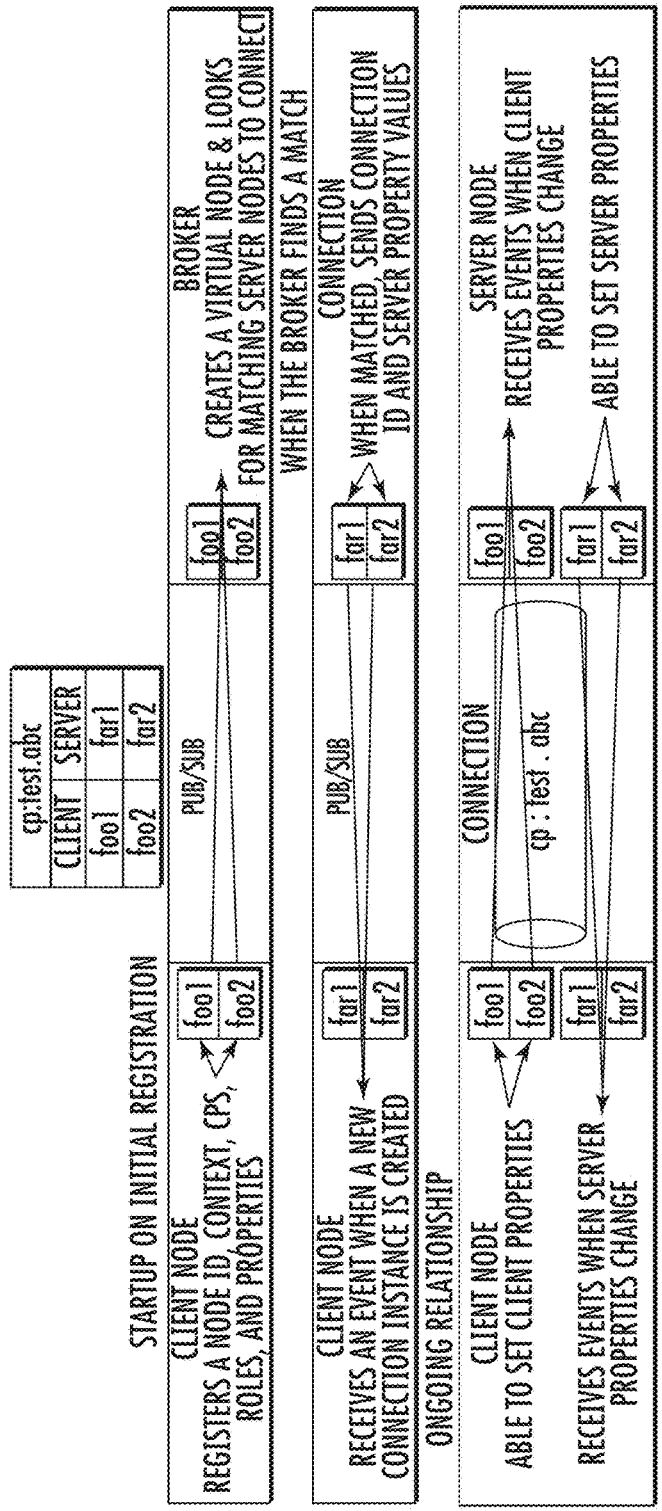
FIG. 11 is a schematic illustration of the selection of a Connection profile by the Broker and establishment of a Connection instance between a server application instance and a client application instance as defined by information maintained by the Broker in some embodiments according to the present invention.

FIG. 11 is a schematic illustration of the selection of a Connection profile by the Broker and establishment of a Connection instance between a server application instance and a client application instance as defined by information maintained by the Broker in some embodiments according to the present invention. According to FIG. 11, the Connection profile cp:test.abc is included in the registry among the pre-established connection profiles that are accessible to the Broker for selection to establish connection instance between server and client applications that can use the connection profile cp:test.abc. As shown the Connection profile cp:test.abc specifies that a Client that uses Connection profile cp:test.abc should have or use metadata foo1, foo2, whereas a Server that uses Connection profile cp:test.abc should have or use metadata far1, far2. It will be understood that the metadata can describe data of the have/used by the Client/Server such as a node ID that identifies the Client/Server, a Context, and other data as described herein.

In some embodiments according to the invention, the client application instance and the server application instance can each specify a respective context to the connection profile Broker. In some embodiments according to the invention, the context can be expressed as the scope metadata as described herein. It will be understood, however, that the expression of the context is not limited to the scope metadata. For example, in other embodiments according to the present invention, the context can be expressed in any way that describes the circumstances that define the setting for an application area. Accordingly, after receiving the context from the server application instance and the client application instance, the connection profile broker can determine whether the respective contexts relate to the same application area.

In some embodiments according to the invention, the context provided to the connection profile broker can be a string that describes the circumstances that define the setting for an application area, which may be determined by the connection profile broker to be within the same context.

According to FIG. 11, to begin the initial registration of the Client with the Broker, the Client publishes the Connection profile cp:test.abc and data described by foo1, foo2 to the Broker, which generates a virtual node representing the Client. The Server carries out an analogous registration process with the Broker wherein the Server publishes the Connection profile cp:test.abc and data described by far1, far2 to the Broker. In response, the Broker transmits a Connection instance ID (A) to the Client and the Server. As shown in FIG. 11, when the connection instance (A) is in use, the Client transmits data described by foo1, foo2 to the Server, whereas the Sever transmits data described by far1, far2 to the Client.

As described above, when the Broker, the Client application instance, or the server Application instance is terminated, the information generated by the Broker for the establishment of the Connection instance A is lost. Accordingly, after the Broker, the Client application instance, or the server Application instance is re-established, the information used by for the Connection instance A is unavailable such the Client application instance and the server application instance will both re-register with the Broker to re-establish a connection instance using a Connection profile.

Figure 12:
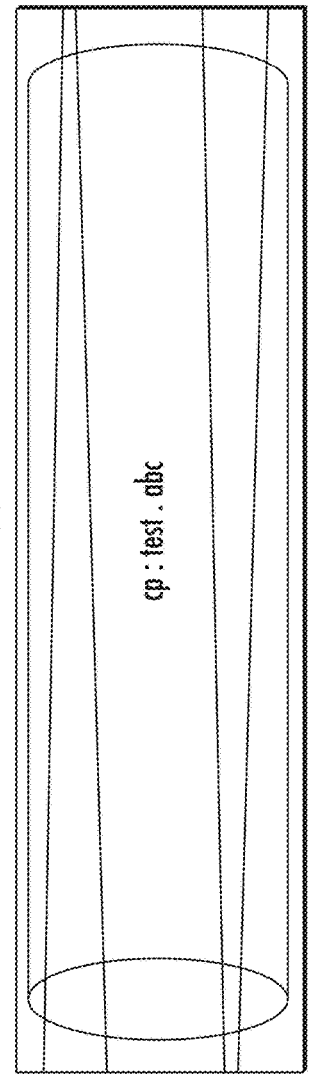
FIG. 12 is a schematic illustration of a non-volatile storage system configured to store information identifying a persistent connection instance A that is maintained after at least one of the Broker, the server application instance or the client application instance is terminated and is accessible after re-establishment of the Broker, the server application instance and/or the client application instance, so that the persistent connection instance A may continue to be used without repeating the registration process for the Client application instance and the server application instance with the Broker in some embodiments according to the invention.

FIG. 12 is a schematic illustration of a non-volatile storage system 1200 configured to store information identifying a persistent connection instance A using Connection profile cp: test.abc that is maintained after at least one of the Broker, the server application instance or the client application instance is terminated and is accessible after re-establishment of the Broker, the server application instance and/or the client application instance, so that the persistent connection instance A may continue to be used without repeating the registration process for the Client application instance and the server application instance with the Broker in some embodiments according to the invention. According to FIG. 12, the information foo1, foo2 and far1, far2 describe the persistent Connection instance A that exists between the Client application instance and the server application instance in FIG. 11. The information foo1, foo2 and far1, far2 can be stored in the non-volatile storage system 1200 that is accessible to the Broker, such that when, for example, the Client application instance is terminated, the Broker can notify the server application instance that is participating in persistent Connection instance A that the Client application instance is no longer available.

When the Client application instance again becomes available, the Client application instance declares itself to the Broker (as was performed on the initial registration as shown in FIG. 11) and the Broker determines that the Client application instance was participating in persistent Connection instance A. In some embodiments according to the invention, the Client application instance provides the Broker with the Node ID (as shown in FIG. 11), which can be stored with the information associated with the persistent Connection instance A in the non-volatile stage system. After determining that the Client application instance is the same Client application instance that was participating in persistent Connection instance A, the Broker can provide far1, far2 to the Client application instance whereupon the Client application instance and the Server application instance can resume communication over the persistent Connection instance A. Accordingly, in some embodiments according to the invention, the process shown in FIG. 11 after the Client application instance is registered with the Broker can be eliminated thereby avoiding the need for the Server application instance to re-re-register with the Broker.

According, in some embodiments according to the invention as illustrated in FIG. 12, the persistent connection instance information can be stored by (or is otherwise accessible to) the Broker permanently or until the specific connection instance is proactively terminated by either the Client or Server System. In some embodiments according to the invention, the Broker can act both as a communication path between systems as well as a store of the information associated with the persistent Connection instance A including the state of the Connection instance, and all other information shared between the two systems as specified by the Connection profile.

In some embodiments according to the present invention, if the Broker application is restarted for whatever reason, all of the information regarding each of the persistent connection instances held in the non-volatile system prior to the restart would be accessible by the Broker. When the Broker restarts, it would retrieve the information stored in the non-volatile system and provide such information to the client and server instances associated with the connection instance (as indicated by the information retrieved by the Broker) to re-establish connection instance. It will be understood that the process can be provided for each connection instance that existed prior to the broker restart.

Figure 15:
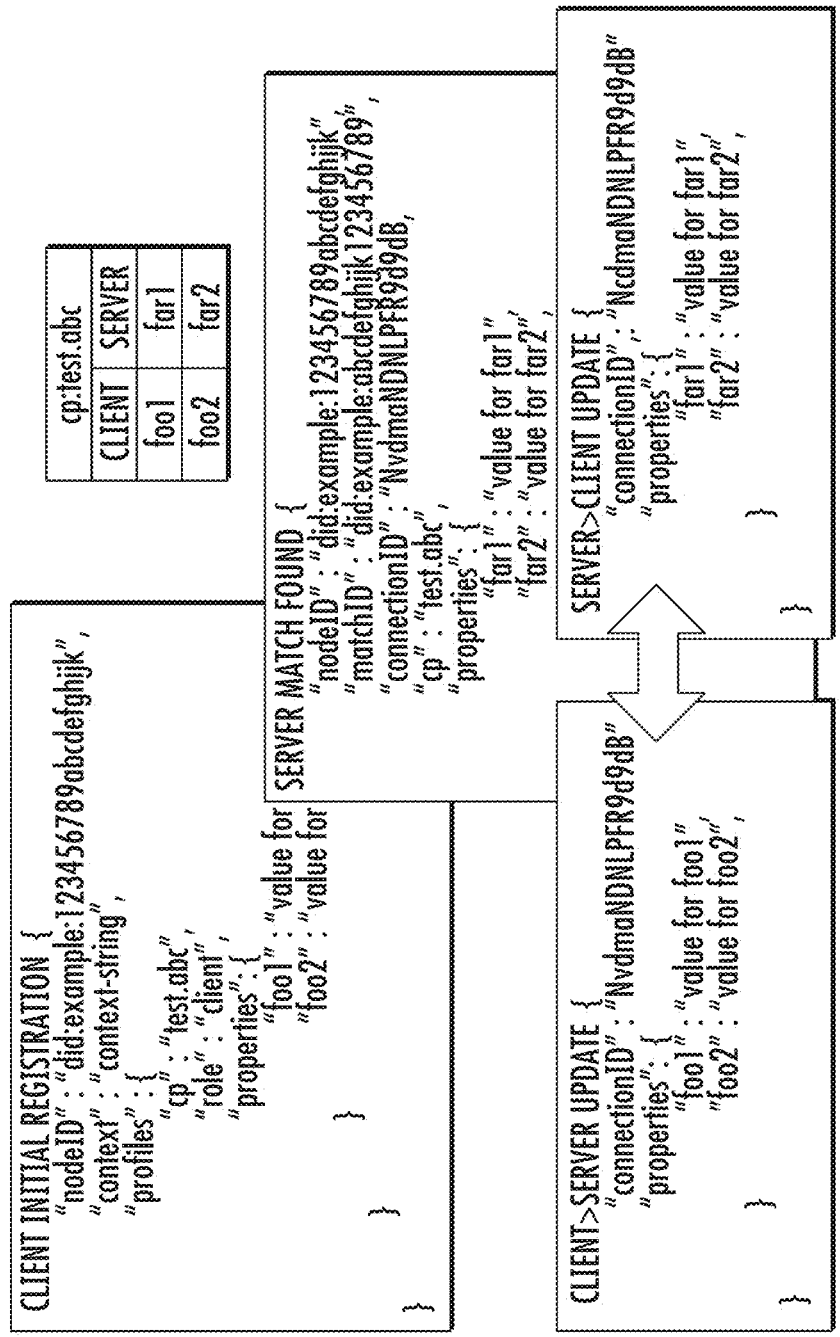
FIG. 15 shows examples of JSON blocks of information for message contents associated with systems shown in FIGS. 11 and 12 in some embodiments according to the invention.

FIG. 15 shows examples of JSON blocks of information for message contents associated with systems shown in FIGS. 11 and 12 in some embodiments according to the invention. According to FIG. 15, for the persistent connection instance foo1, foo2 and far1, far2, a JSON block is shown for the Client application instance initial registration with the broker, a JSON block illustrating the result of the broker determining a matching Server application instance, as well as JSON blocks for updates to the client or server data specified by the respective metadata in some embodiments according to the invention.

Figure 13:
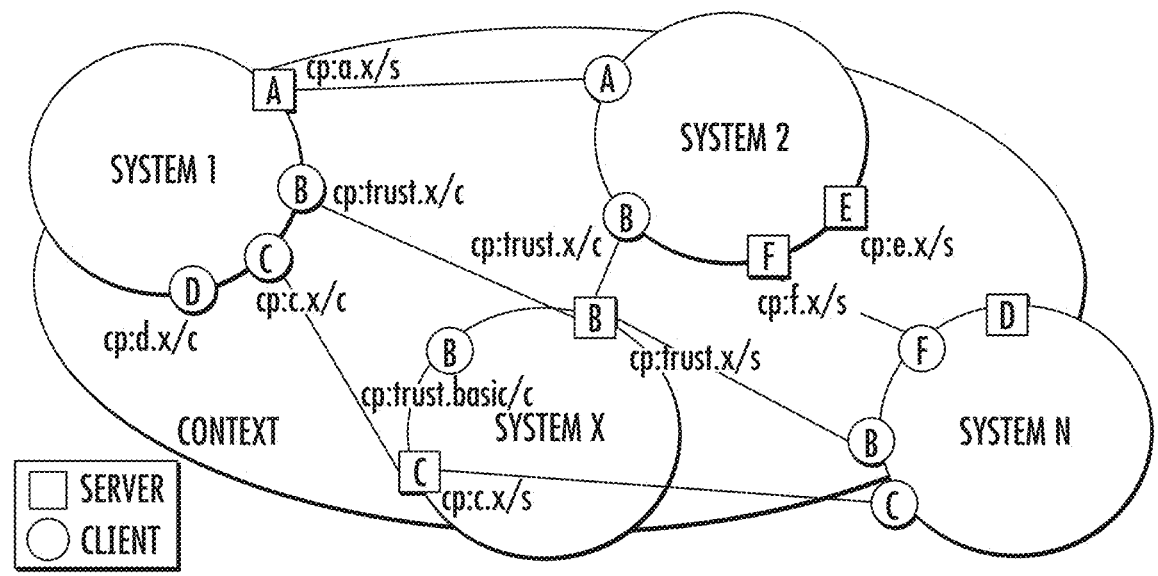
FIG. 13 is a schematic illustration of a plurality of systems representing clients and servers that can establish persistent and non-persistent connection instances using connection profiles selected by the broker from the connection profile registry in some embodiments according to the invention.

FIG. 13 is a schematic illustration of a plurality of systems 1, 2, N, and X representing client application instances and server application instances that can establish persistent or non-persistent connection instances A-D using connection profiles selected by the Broker from the connection profile registry in some embodiments according to the invention. According to FIG. 13, each of the systems 1, 2, N, and X establish and participate in the persistent connection instances A-D shown to communicate with one another according to the process shown in FIGS. 11 and 12. For example, as shown, System 1 can communicate with System 2 using the persistent connection instance A, and can communicate with System N and System X using the persistent connection instance B, and can communicate with System X using the persistent connection instance C. Further the information associated with each of the persistent connection instances A-D is stored in the non-volatile storage system accessible to the Broker so that the persistent connection instances A-D can be maintained when, for example, the system 1 is unavailable, and moreover, can be resumed when the system 1 is restored. Although embodiments according to FIG. 13 are described with reference to persistent connection instances, it will be understood that the systems shown may also participate in non-persistent connection instances as well.

Figure 14:
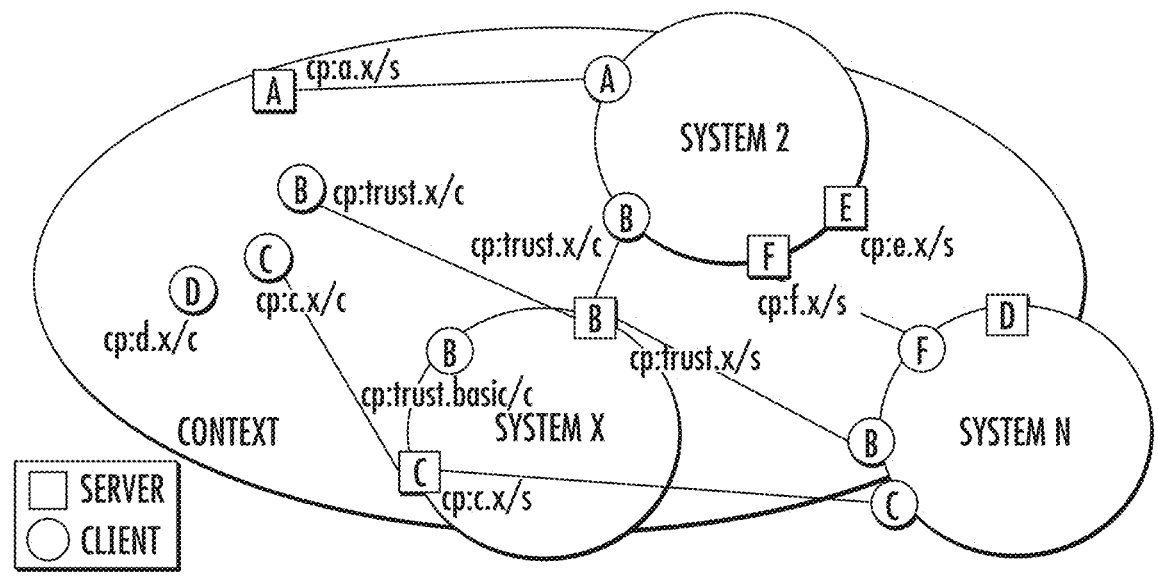
FIG. 14 is a schematic illustration of the plurality of systems shown in FIG. 13 wherein System 1 is terminated while participating in persistent connection instances A-D with Systems 2 and N, such that the persistent connection instances A-D are maintained so that the when the System 1 is again available, it can continue participation in the persistent connection instances A-D in some embodiments according to the invention.

FIG. 14 is a schematic illustration of the plurality of systems shown in FIG. 13 wherein the System 1 is terminated while participating in persistent connection instances A-D with Systems 2 and N, such that the persistent connection instances A-D are maintained so that the when the System 1 is again available, it can continue participation in the persistent connection instances A-D in some embodiments according to the invention. According to FIG. 14, after the System 1 is terminated the information associated with the persistent connection instances A-D is maintained in the non-volatile storage system. When the System 1 is again available, the System 1 re-registers with the Broker (as shown in FIG. 11). The Broker determines (using for example the Node ID of the System 1) that the System 1 was participating in connection instances A-D. The Broker then forwards the information associated with the each of the persistent connection instances A-D to the System 1. In some embodiments according to the invention, the Broker can forward the information associated with the each of the persistent connection instances A-D including the Node IDs of Systems 2 and N, X and the information analogous to far1, far2 shown in FIGS. 11 and 12.

In the drawings and specification, there have been disclosed typical preferred embodiments of the inventive subject matter and, although specific terms are employed, they are used in a generic and descriptive sense only and not for purposes of limitation, the scope of the inventive subject matter being set forth in the following claims.

What is claimed:

1. A method of connecting applications over a network, the method comprising:
    generating a server application instance that specifies server metadata that describes how information is provided by the server application to a connected client application instance that is connected to the server application instance over the network;
    generating a client application instance that specifies client metadata that describes how information that the client application instance uses is provided to the client application instance by a connected server application connected to the client application instance;
    receiving a declaration of a name of a connection profile for the server application instance and a declaration of a same connection profile for the client application instance,
    wherein the name of the connection profile is a unique name that specifies a use case for a connection, specifies a provider role and a consumer role, properties that each of the provider role and the consumer role supply and a context in which the use case is applied;
    wherein the context comprises an identification of a physical or logical entity or a set of environmental or operational circumstances that are mutually recognized and utilized by both the server and client application instances; and
    wherein the context comprises one or more of a piece of equipment, a room in a building, an entire building, a city, a ship and/or any entity including one or more devices and/or systems from multiple vendors;
    automatically connecting the server application instance with the client application instance using the declared name of the connection profile;
    generating a connection instance using the declared name of the connection profile, wherein the connection instance specifies that the server application instance provides information to the client application instance and that the client application instance provides information to the server application instance; and
    establishing a connection to transmit payload information between the server application instance and the client application instance over the network.

2. The method of claim 1, further comprising determining that the server metadata and the client metadata are both specified by the declared name of the connection profile as metadata used for the connection instance.

3. The method of claim 2 further comprising:
    determining that a first portion of the declared name of the connection profile matches a first portion of a declaration of the server application instance and matches a first portion of a declaration of the client application instance; and
    determining that a second portion of the declaration of the server application instance and a second portion of the declaration of the client application instance indicate complementary functions.

4. The method of claim 3 wherein the second portion of the declaration of the server application instance is iHave and the second portion of the declaration of the client application instance is iUse.

5. The method of claim 4 wherein iHave comprises Dropbox folder login credentials and iUse comprises a function to use the Dropbox folder login credentials to access the Dropbox folder.

6. A method of connecting applications over a network, the method comprising:
    generating a server application instance that specifies server metadata that describes how information is provided by the server application to a connected client application instance that is connected to the server application instance over the network;
    generating a client application instance that specifies client metadata that describes how information that the client application instance uses is provided to the client application instance by a connected server application connected to the client application instance;
    receiving a declaration of a name of a connection profile for the server application instance and a declaration of a same connection profile for the client application instance,
    wherein the name of the connection profile is a unique name that specifies a use case for a connection, specifies a provider role and a consumer role, properties that each of the provider role and the consumer role supply and a context in which the use case is applied;
    wherein the context comprises an identification of a physical or logical entity or a set of environmental or operational circumstances that are mutually recognized and utilized by both the server and client application instances; and
    wherein the context comprises one or more of a piece of equipment, a room in a building, an entire building, a city, a ship and/or any entity including one or more devices and/or systems from multiple vendors;
    generating a connection instance using the declared name of the connection profile, wherein the connection instance specifies that the server application instance provides information to the client application instance and that the client application instance provides information to the server application instance; and
    establishing a connection to transmit payload information between the server application instance and the client application instance over the network,
    wherein the server application instance and the client application instance are instantiated within a hierarchy of relationships and wherein the server metadata further includes server scope metadata that is declared by the server application instance to a connection profile broker which describes each type of relationship that is allowed between the server application instance and another application instance within the hierarchy of relationships;
    wherein the client metadata further includes client scope metadata that is declared by the client application instance to the connection profile broker which describes each type of relationship that is allowed between the client application instance and another application instance within the hierarchy of relationships, the method further comprising:
    determining that the client application instance is related to the server application instance by at least one type of relationship that is included in the client scope metadata based on the client scope metadata declared by the client application instance to the connection profile broker; and
    determining that the server application instance is related to the client application instance by at least one type of relationship that is included in the server scope metadata based on the server scope metadata declared by the server application instance to the connection profile broker.

7. The method of claim 6 wherein each type of relationship that is allowed includes child, parent, parents, context, team, system and/or sibling.

8. The method of claim 6 wherein determining that the client application instance is related to the server application instance by at least one type of relationship comprises:
   determining that a parent field in a record for the server application instance that is stored in a database of the hierarchy of relationships, includes a direct or indirect reference to the client application instance.

9. The method of claim 8 wherein an indirect reference comprises a contiguous chain of direct references included in respective parent fields that link the client application instance and the server application instance together in the hierarchy of relationships.

10. The method of claim 9 wherein the direct or indirect reference comprises a universally unique identifier (UUID).

11. The method of claim 6 wherein the client application instance comprises a related client application instance at the same level in the hierarchy of relationships.

12. The method of claim 1 further comprising:
   after establishing the connection, using a connection profile broker to update the connection instance, to replace the server metadata with updated server metadata and/or using the connection profile broker to update the connection instance to replace the client metadata with updated client metadata.

13. The method of claim 12 wherein the connection profile broker is outside transmission of the payload information between the server application instance and the client application instance over the network.

14. The method of claim 13 further comprising:
   at the connection profile broker, receiving a request from a firewall for information indicating validity of a communication specified by the firewall; and
   determining whether the communication corresponds to any connection established by the connection profile broker using the connection profile.

15. The method of claim 1 wherein the connection between the server application instance and the client application instance includes a connection profile broker and is configured to pass the information described by the server metadata and the client metadata between the server application instance and/or the client application instance.

16. The method of claim 1 wherein the server metadata comprises data associated with operation of an Internet-of-Things (IoT) system.

17. A method of connecting applications over a network, the method comprising:
   responsive to generating a server application instance and generating a client application instance, selecting an established connection profile among a plurality of established connection profiles responsive to receiving a declaration of a name of a connection profile for the server application instance and a declaration of a same connection profile for the client application instance,
   wherein the name of the connection profile is a unique name that specifies a use case for a connection, specifies a provider role and a consumer role, properties that each of the provider role and the consumer role supply and a context in which the use case is applied;
   wherein the context comprises an identification of a physical or logical entity or a set of environmental or operational circumstances that are mutually recognized and utilized by both the server and client application instances; and
   wherein the context comprises one or more of a piece of equipment, a room in a building, an entire building, a city, a ship and/or any entity including one or more devices and/or systems from multiple vendors;
   generating a connection instance using the declared name of the connection profile, wherein the connection instance specifies that the server application instance provides information to the client application instance and that the client application instance provides information to the server application instance; and
   establishing a connection that is outside a connection profile broker to transmit payload information between the server application instance and the client application instance over a network.

18. The method of claim 1, wherein the one or more devices and/or systems comprise one or more of lighting systems, security camera systems, heating systems and/or air conditioning systems.

19. The method of claim 1, wherein the connection profile further defines what each of the provider and the consumer role contribute to a network and expect from the network and other nodes across the network.

* * * * *